United States Patent
Goh et al.

(10) Patent No.: US 11,219,973 B2
(45) Date of Patent: Jan. 11, 2022

(54) CONDUCTIVE POLYMER COMPOSITE AS PLASTIC SOLDER

(71) Applicant: AGENCY FOR SCIENCE, TECHNOLOGY AND RESEARCH, Singapore (SG)

(72) Inventors: Kuan Eng Johnson Goh, Singapore (SG); Siew Ting Melissa Tan, Singapore (SG); Sen Wai Kwok, Singapore (SG); Kok Hin Henry Goh, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 496 days.

(21) Appl. No.: 15/567,934

(22) PCT Filed: Apr. 20, 2016

(86) PCT No.: PCT/SG2016/050186
§ 371 (c)(1),
(2) Date: Oct. 19, 2017

(87) PCT Pub. No.: WO2016/171623
PCT Pub. Date: Oct. 27, 2016

(65) Prior Publication Data
US 2018/0085862 A1    Mar. 29, 2018

(30) Foreign Application Priority Data
Apr. 20, 2015 (SG) .............. 10201503092S

(51) Int. Cl.
| | |
|---|---|
| *B23K 1/00* | (2006.01) |
| *B23K 35/36* | (2006.01) |
| *B23K 35/30* | (2006.01) |
| *B23K 101/42* | (2006.01) |

(52) U.S. Cl.
CPC ........ *B23K 35/3613* (2013.01); *B23K 1/0016* (2013.01); *B23K 35/3006* (2013.01);
(Continued)

(58) Field of Classification Search
CPC .............. B23K 1/0016; B23K 35/0244; B23K 35/3613; B23K 1/0008; B23K 1/018;
(Continued)

(56) References Cited

U.S. PATENT DOCUMENTS 3,804,923 A * 4/1974 Suzuki et al. ....... H05K 1/0326
                                                              525/285
4,509,994 A * 4/1985 Barajas ................ B23K 35/025
                                                              148/24

(Continued)

OTHER PUBLICATIONS

Katz, et al., "Conductive polymer composites as a replacement for conventional lead-based solders," International SAMPE Electronics Conference: Critical Materials and Processes in a Changing World, 1994, pp. 44-50, vol. 7, Livingston, New Jersey.

(Continued)

*Primary Examiner* — Erin B Saad
(74) *Attorney, Agent, or Firm* — Womble Bond Dickinson (US) LLP

(57) ABSTRACT

There is provided a method for soldering a first non-metallic component to one or more metallic or non-metallic component, the method comprising the step of removably securing the first non-metallic component to the one or more metallic component by using a conductive polymeric composite or removably securing the first non-metallic component to the one or more non-metallic component by using the conductive polymeric composite, wherein the conductive polymeric composite used in the method comprises a blend of at least one filler material and at least one thermoplastic polymer.

9 Claims, 4 Drawing Sheets

(52) U.S. Cl.
CPC ...... *B23K 35/3033* (2013.01); *B23K 35/3046* (2013.01); *B23K 2101/42* (2018.08)

(58) Field of Classification Search
CPC .... B23K 1/19; B23K 1/203; B23K 2101/006; B23K 2101/40; B23K 35/0222; B23K 35/025; B23K 35/0272; B23K 35/26; B23K 35/266; B23K 35/268; B23K 35/286; B23K 35/30; B23K 35/3006; B23K 35/302; B23K 35/3046; B23K 35/3053; B23K 35/32; B23K 35/325; B23K 35/36; B23K 35/3602; B23K 35/3607; B23K 35/3612; B23K 35/362; B23K 3/025; B23K 3/026
See application file for complete search history.

(56) References Cited

U.S. PATENT DOCUMENTS

| | | | |
|---|---|---|---|
| 4,822,979 A * | 4/1989 | deKam | B23K 3/0315 219/229 |
| 5,062,896 A | 11/1991 | Huang et al. | |
| 6,121,689 A | 9/2000 | Capote et al. | |
| 8,167,190 B1 | 5/2012 | Bullock et al. | |
| 2002/0187321 A1* | 12/2002 | Hirano | H05K 1/0373 428/209 |
| 2014/0158255 A1 | 6/2014 | Gerrard et al. | |
| 2014/0183715 A1* | 7/2014 | Kanamori | H01L 23/49513 257/676 |

OTHER PUBLICATIONS

The International Search Report for PCT Application No. PCT/SG2016/050186 dated Jun. 13, 2016, 4 pages.

PCT International Search Report for PCT Counterpart Application No. PCT/SG2016/050186, 4 pgs. (dated Jun. 13, 2016).

PCT Written Opinion for PCT Counterpart Application No. PCT/SG2016/050186, 5 pgs. (dated Jun. 13, 2016).

PCT Notification of transmittal of the International Preliminary Report on Patentability for counterpart PCT application No. PCT/SG2016/050186; dated Oct. 6, 2016; 6 pp.

* cited by examiner

[Fig. 1]
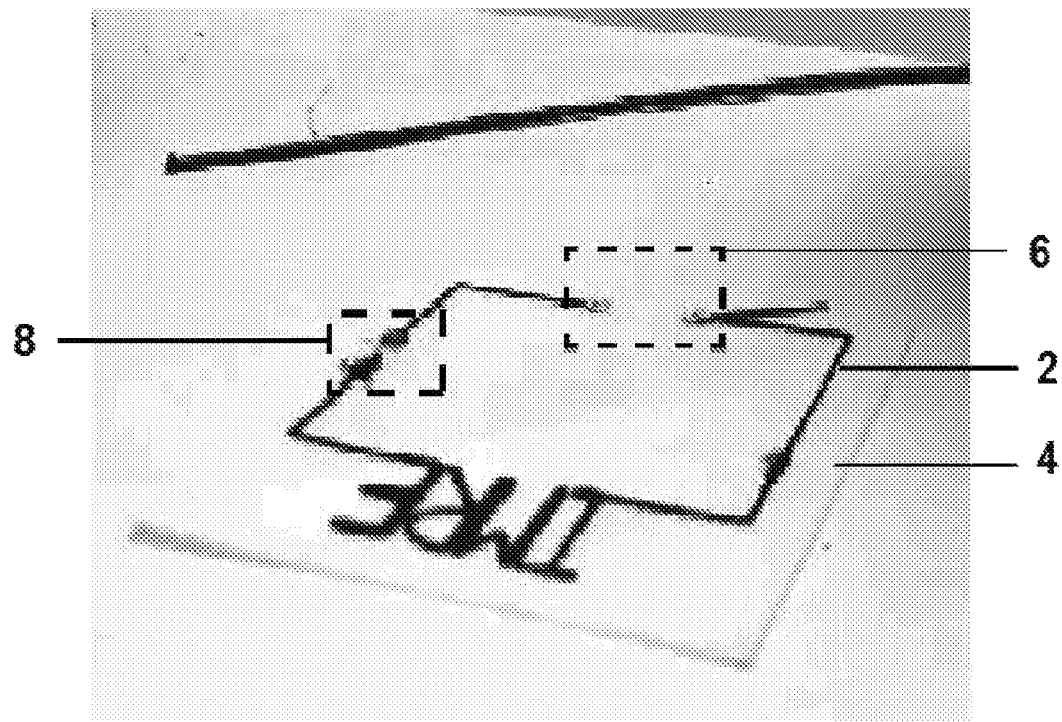
[Fig. 2]
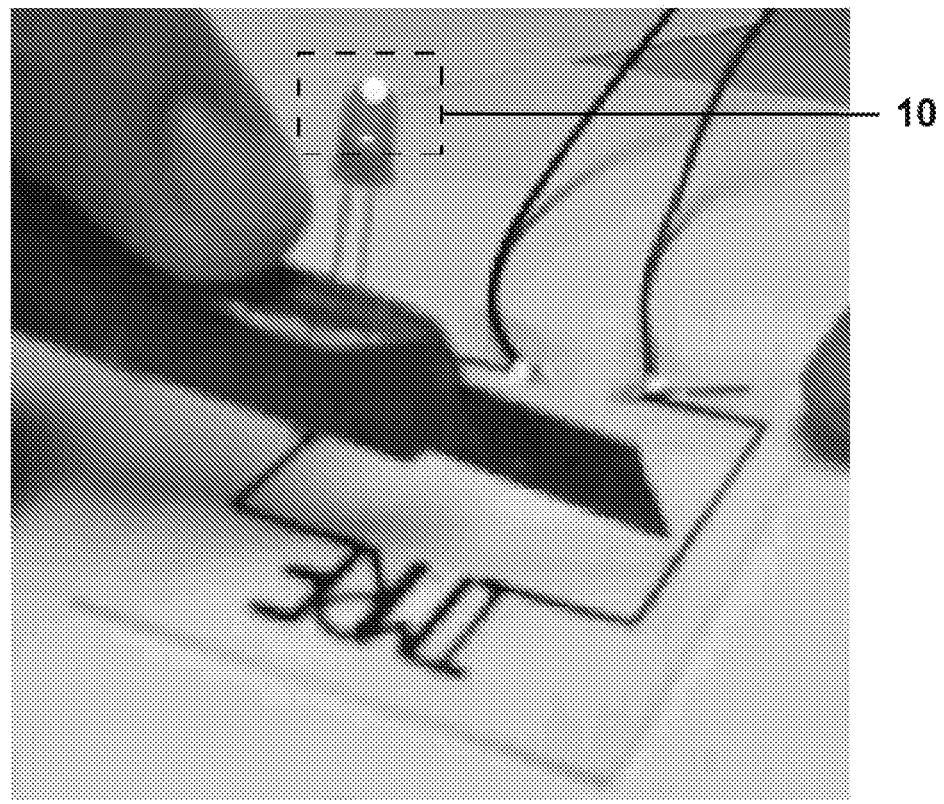

[Fig. 3]
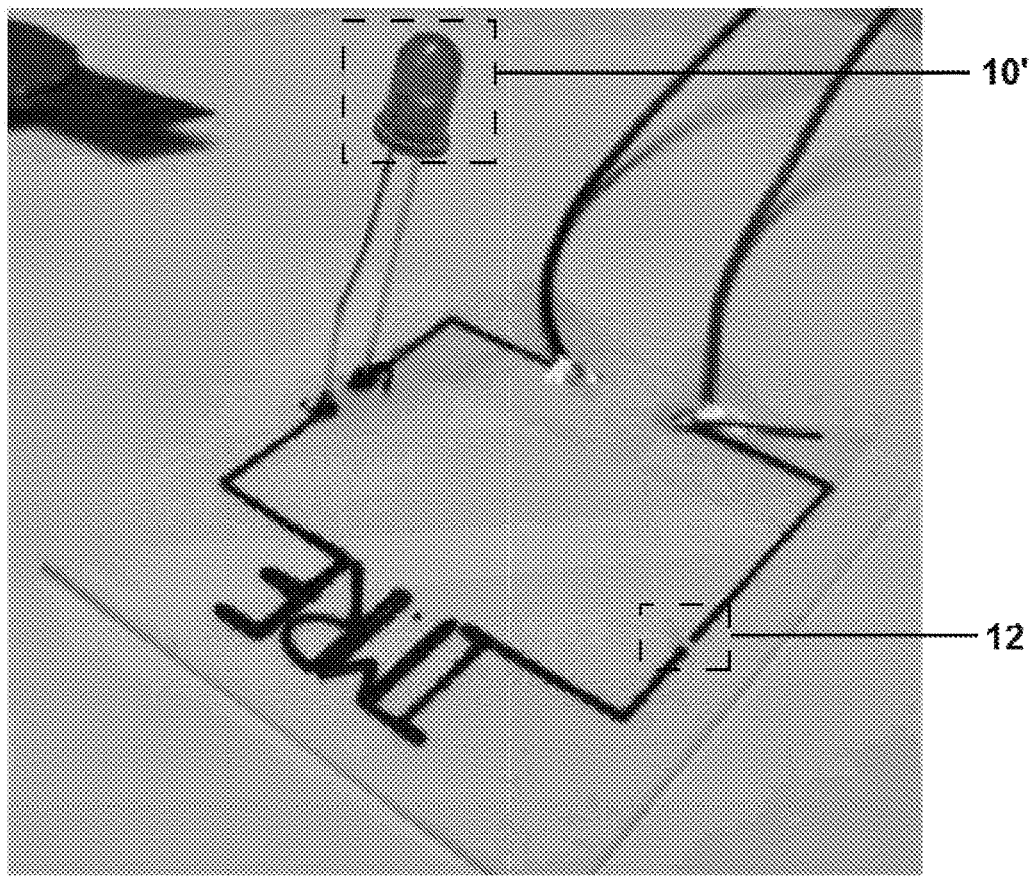
[Fig. 4]
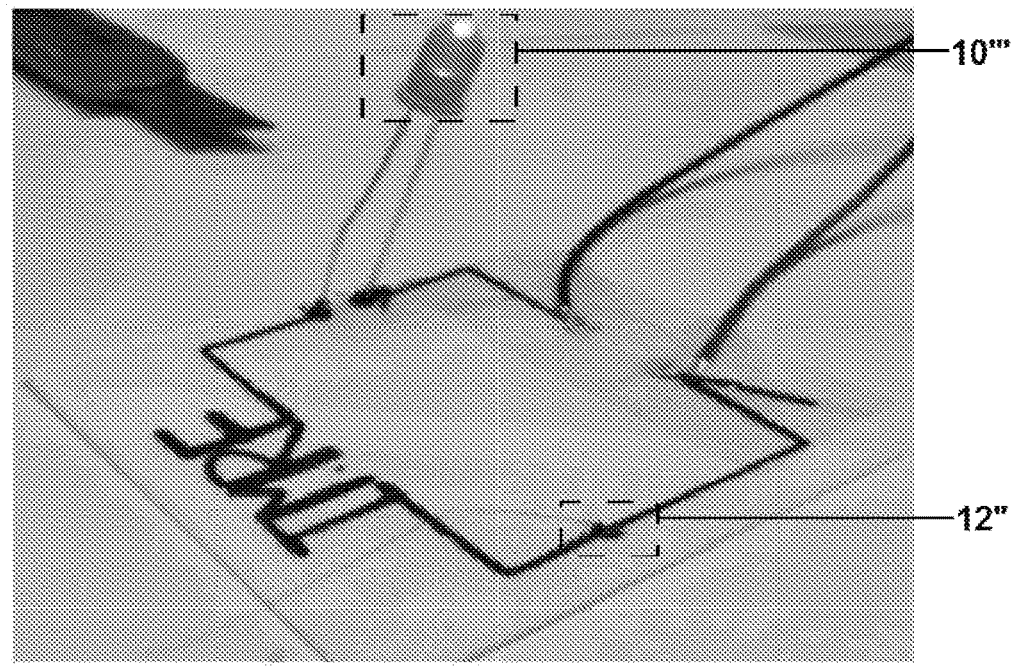

[Fig. 5]
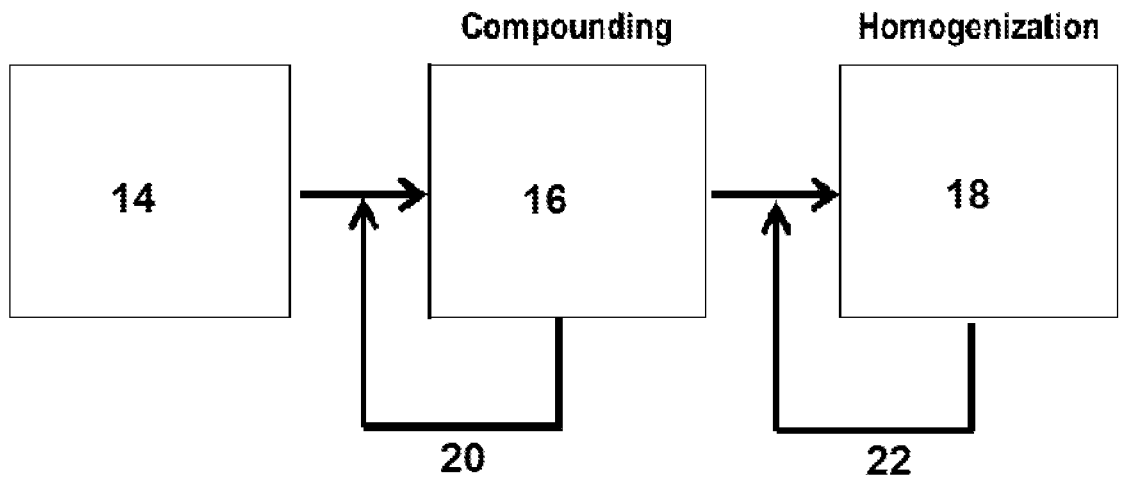
[Fig. 6]
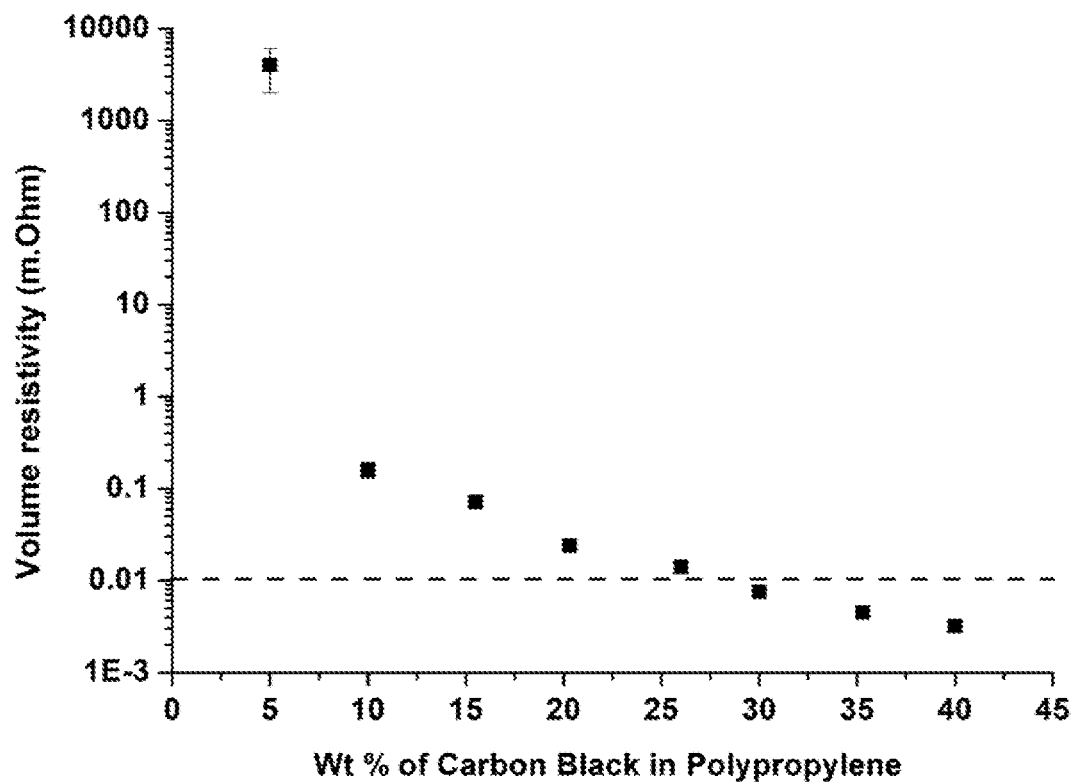

[Fig. 7]
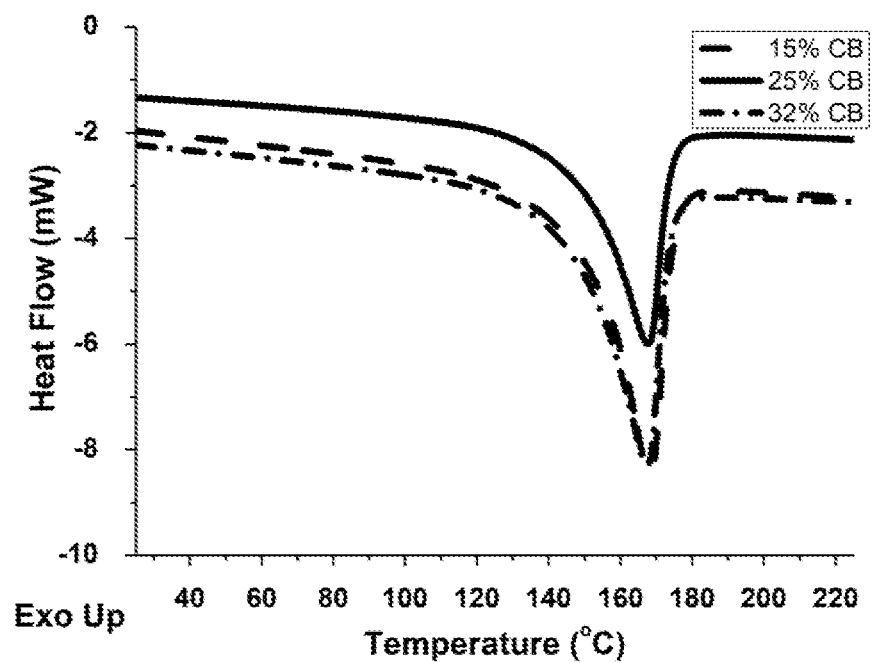
[Fig. 8]
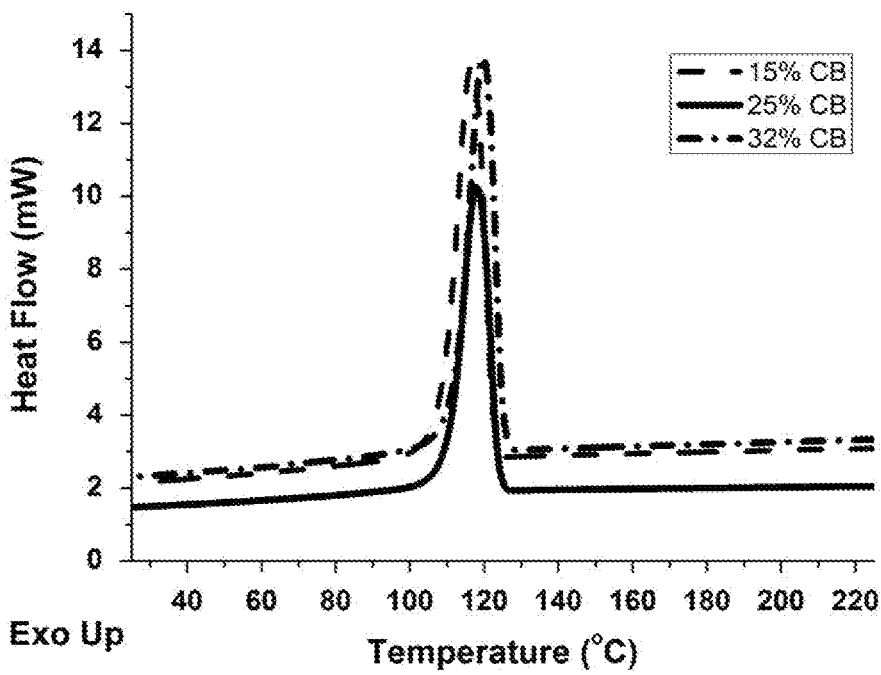

ns that

CONDUCTIVE POLYMER COMPOSITE AS PLASTIC SOLDER

CROSS-REFERENCE TO RELATED APPLICATIONS

This patent application is a U.S. National Phase Application under 35 U.S.C. § 371 of International Application No. PCT/SG2016/050186, filed on 20 Apr. 2016, entitled CONDUCTIVE POLYMER COMPOSITE AS PLASTIC SOLDER, which claims the benefit of priority of Singapore provisional application No, 102015030925, filed 20 Apr. 2015.

TECHNICAL FIELD

The present invention generally relates to a method for soldering a first non-metallic component to one or more metallic or non-metallic component. The present invention also relates to the use of a conductive polymer composite for soldering a first non-metallic component to one or more metallic or non-metallic component.

BACKGROUND ART

Typically, soldering technique involves the use of a metal, including alloys, in order to secure two circuit components together or to secure one or more components onto a substrate. This can be used to repair damaged electrical circuits or connections. However, conventional metal and alloy solders have poor wettability or adhesion on non-metallic substrates such as plastics or glass. As a result, they are likely to be unsuitable for securing electronic or conductive components to polymer-based three dimensional (3D) printed circuits.

To address this, incorporating holes or contacts lined with conductive materials in 3D printed devices have been proposed. However, these methods do not offer satisfactory contact between the electrical components and the circuit. The electrical components also tend to suffer from poor connection or lack the capability to be secured to the 3D printed device sufficiently for prolonged use.

Other soldering methods may be more cumbersome as they involve the use of additives or flux in order to solder electronic components onto non-metallic substrates or components.

Conductive adhesives (e.g. silver-based epoxy adhesives) for soldering methods have been explored to address the abovementioned problem of substrate compatibility but these adhesives suffer from certain limitations. These adhesives are typically applied as pre-polymers and after application, additional time and elevated temperatures tend to be required for curing. These adhesives may also contain organic solvents and such chemicals may be harmful to its user.

Meanwhile, new soldering materials have been further proposed. Some of these materials include those used for electromagnetic interference (EMI) shielding but they tend to have very poor conductivities. Using these as solders tend to be infeasible as the voltage drop may be significant at the soldering points and this may render the mended circuits inoperable.

Another class of soldering material that has been proposed is thermoset-based material. Unfortunately, thermosets suffer from poor reflowability or may not be reflowable without chemical degradation after curing. For this reason, thermosets may be incompatible with 3D printing pens that are used to solder 3D-printed electronic components or circuits.

Other explored materials tend to be unstable when stored at ambient atmospheres and temperatures, which also render transportation of these materials difficult. For instance, thermoset-based solder often comes as a two-part solution that needs to be premixed before used. If it comes as a one part pre-polymeric composite, non-ambient conditions may be required for storage (e.g. less than 0° C.). Thus, two-part-based thermoset solders tend to be cumbersome while one-part-based thermoset solder may be limited by their portability.

There is a need to provide a soldering method that involves a soldering material which is capable of overcoming, or at least ameliorating, one or more of the disadvantages described above. There is also a need to provide a soldering material for use in making the soldering process easier and less cumbersome compared to conventional soldering techniques involving conventional soldering materials.

The provided method involving the provided soldering material needs to be capable of removably securing a non-metallic component to a metallic or non-metallic component or substrate while circumventing or mitigating the above limitations.

SUMMARY OF INVENTION

According to one aspect, there is provided a method for soldering a first non-metallic component to one or more metallic or non-metallic component, the method comprising the step of removably securing the first non-metallic component to the one or more metallic component by using a conductive polymeric composite; or removably securing the first non-metallic component to the one or more non-metallic component by using the conductive polymeric composite, wherein the conductive polymeric composite used in the method comprises a blend of at least one filler material and at least one thermoplastic polymer.

This method may also comprise the step of joining the respective ends of electronic components together using the conductive polymeric composite.

Advantageously, the above method circumvents the need for additional additives, harmful organic solvents or additional time and elevated temperatures. This method can also be used to form, improve or repair electrical connections between components.

Advantageously, the method relies on a conductive polymeric composite which may have high conductivities to sustain a voltage across the soldering points. Conversely, the conductive polymer composite may have low resistivities, such as in the range of about $10^{-3}$ Ωm to about 10 Ωm. The resistivity of the conductive polymer composite may be dependent or independent of the amount of conductive filler present in the composite.

Advantageously, due to the presence of the thermoplastic polymer in the conductive polymeric composite, the thermoplastic polymer can be re-flowed after the solder has been set. The ability to reflow solder is highly advantageous for changing components in circuitry and for repairing a circuit. The conductive polymeric composite may be stored under ambient atmosphere and temperature due to the chemical stability of the conductive polymeric composite.

The above method may be used to solder electrical or electronic components that are present on porous or non-porous substrates. These substrates may include plastic, glass, any flexible substrates or their combinations thereof. Where the substrate is glass, the thermoplastic polymer may comprise a polar polymeric matrix.

The above method may be applicable for soldering thermally sensitive assemblies or components since elevated temperatures are avoided.

The conductive polymeric composite may be used to form electrical connections between the electronic components. Hence, the electrical connections may be between the non-metallic electronic component and metallic electronic component or between the non-metallic electronic component and another non-metallic electronic component. The conductive polymeric composite may be used to assemble or repair flexible circuits used to bond flexible substrates and connectors.

The conductive polymeric composite may comprise a blend of the filler material and the thermoplastic polymer. The filler material may be dispersed within the thermoplastic polymer which may form a (continuous) matrix. Conversely, the filler material may be the continuous phase and the thermoplastic polymer may form a non-continuous phase. The internal structure of the conductive polymeric composite then depends on the choice of the filler and the thermoplastic polymer used, as well as their relative ratios.

Advantageously, the filler material may be resistant against degradation by moisture and oxygen. Additionally or alternatively, the thermoplastic may be resistant against degradation by moisture and oxygen. In a preferred embodiment, both the filler material and the thermoplastic may be resistant against degradation by moisture and oxygen.

The filler material may be a conductive filler material. Due to the conductive nature of the filler material, the filler material imparts conductive properties to the normally insulating thermoplastic polymer such that the resultant polymer composite exhibits conductivity. The conductive filler may be non-metallic, metallic or metal-coated carbon based. More than one type of conductive filler may be used in the conductive polymer composite. Hence, the one type, two types or all three types of conductive filler may be present in the conductive polymer composite.

The filler material may be present in the conductive polymer composite at a weight percentage (based on the weight of the composite) of about 20% to about 40%. This range of filler material does not compromise the abovementioned advantages provided by the present method involving the resultant conductive polymeric composite.

The thermoplastic polymer may comprise one or more monomers selected from the group consisting of acrylates, phthalamides, acrylonitriles, cellulosics, styrenes, alkyls, alkyls methacrylates, alkenes, halogenated alkenes, carboxylic acids, amides, imides, aryletherketones, butadienes, ketones, esters, acetals, hydroxyalkanoates, urethanes, dialkylsiloxanes, carbonates and their optionally substituted forms thereof.

An exemplary conductive polymer composite may be made up of polypropylene pellet with carbon black as the non-metallic conductive filler.

The conductive polymer composite may be used with standard soldering tips using optimal soldering temperature of 165° C. to 185° C. or can be used with extrusion pens with hot-end temperatures of 220° C. to 230° C.

The conductive polymer composite may be compatible with standard electrical components (such as resistors, capacitors, LEDs, thermistors, transistors, etc.) and may be used for soldering or desoldering with a standard soldering tip or hot-end.

The soldering method may be used to repair broken connections in a circuit, may be used to enhance contact between printed layers of exposed wires or to solder circuit components to printed circuits.

In another aspect, there is provided the use of a conductive polymer composite for soldering a first non-metallic component to one or more metallic or non-metallic component, wherein the conductive polymer composite comprises a blend of a filler material and a thermoplastic polymer as defined above. Such a use also possesses the abovementioned advantages.

Definitions

The following words and terms used herein shall have the meaning indicated:

The term "conductive" refers to an object or material that allows or facilitates the flow of electron.

The phrases "removably securing", "removably forming", "removably joining" etc. mean that the securing, forming, joining or other actions may result in an electrical connection, joint or formation which can still be altered or removed subsequently. If the connection is not to be altered or removed, the connection can be regarded as a permanent connection. The removal may be performed with or without the aid of additional devices or conditions. The conditions may include increased or reduced temperatures, additional solvents etc.

The expressions "non-metal", "non-metallic" or other variants refer to any material that does not contain metal. Conversely, the phrases "metal", "metallic", "metalloids" or other variants refer to any material that is capable of conducting electricity.

The phrases "electrical" or "electronic" refer to any element that is capable of conducting electricity and/or having an electrical functionality. For instance, an electrical wire serves to connect to electrical parts together and conducts electricity between these two electrical parts via itself. In another example, a light emitting diode may emit light (electrical functionality) when electricity passes through it. In a further example, a resistor is an electronic device that can be connected to an electrical circuit used to create a potential difference across a portion of the circuit (electrical functionality).

As used herein, the term "alkyl group" includes within its meaning monovalent ("alkyl") and divalent ("alkylene") straight chain or branched chain saturated aliphatic groups having from 1 to 10 carbon atoms, eg, 1, 2, 3, 4, 5, 6, 7, 8, 9, or 10 carbon atoms. For example, the term alkyl includes, but is not limited to, methyl, ethyl, 1-propyl, isopropyl, 1-butyl, 2-butyl, isobutyl, tert-butyl, amyl, 1,2-dimethylpropyl, 1,1-dimethylpropyl, pentyl, isopentyl, hexyl, 4-methylpentyl, 1-methylpentyl, 2-methylpentyl, 3-methylpentyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, 2-ethylpentyl, 3-ethylpentyl, heptyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, 1,1,3-trimethylbutyl, 5-methylheptyl, 1-methylheptyl, octyl, nonyl, decyl, and the like.

The term "alkene" includes within its meaning straight or branched chain unsaturated aliphatic hydrocarbon groups having from 2 to 10 carbon atoms, eg, 2, 3, 4, 5, 6, 7, 8, 9, or 10 carbon atoms and having at least one double bond, of either E, Z, cis or trans stereochemistry where applicable, anywhere in the alkyl chain.

The term "amide" as used herein refers to groups of the form —C(O)—NR$_a$-alkyl- wherein R$_a$ is selected from the group including but not limited to hydrogen, optionally substituted alkyl, optionally substituted alkenyl, and optionally substituted aryl groups. The term "amine" as used herein refers to groups of the form —NR$_a$R$_b$-alkyl- wherein R$_a$ and R$_b$ are individually selected from the group including but not limited to hydrogen, optionally substituted alkyl, optionally substituted alkenyl, and optionally substituted aryl groups. The -alkyl- groups in the "amide" and "amine" can be optionally substituted and preferably have 2 to 10 carbon atoms, more preferably 2 to 6 carbon atoms and most preferred 2 carbon atoms.

The term "carbonate" includes within its meaning —O—C(O)—O-alkyl- groups.

The expression "carboxylic acids" includes within its meaning —COOH groups.

The term "halogen" or variants such as "halide", "halogenated" or "halo" as used herein refers to fluorine, chlorine, bromine and iodine.

The term "imide" refers to a functional group consisting of two acyl groups bound to nitrogen. "Acyl" means an R—C(═O)— group in which the R group may be, but not limited to, an alkyl or aryl group as defined herein. Examples of acyl include acetyl and benzoyl. The acyl group may be a terminal group or a bridging group. If the group is a terminal group it is bonded to the remainder of the molecule through the carbonyl carbon.

"Aryl" as a group or part of a group denotes (i) an optionally substituted monocyclic, or fused polycyclic, aromatic carbocycle (ring structure having ring atoms that are all carbon) preferably having from 5 to 12 atoms per ring. Examples of aryl groups include phenyl, naphthyl, and the like; (ii) an optionally substituted partially saturated bicyclic aromatic carbocyclic moiety in which a phenyl and a $C_{5-7}$ cycloalkyl or $C_{5-7}$ cycloalkenyl group are fused together to form a cyclic structure, such as tetrahydronaphthyl, indenyl or indanyl. The group may be a terminal group or a bridging group. Typically an aryl group may be a $C_6$-$C_{18}$ aryl group.

The term "optionally substituted" as used herein means the group to which this term refers may be unsubstituted, or may be substituted with one or more groups independently selected from $C_1$-$C_6$-alkyl, $C_2$-$C_6$-alkenyl, $C_2$-$C_6$-alkynyl, thio-$C_1$-$C_6$-alkyl, $C_3$-$C_8$-cycloalkyl, $C_3$-$C_8$-cycloalkenyl, five to six membered heterocycloalkyl, halo, —COOH, —CONH$_2$, $C_1$-$C_6$-carboxyl, halo-$C_1$-$C_6$-alkyl, halo-$C_2$-$C_6$-alkynyl, hydroxyl, $C_1$-$C_6$-alkoxy, thio-$C_1$-$C_6$-alkoxy, $C_2$-$C_6$-alkenyloxy, halo-$C_1$-$C_6$-alkoxy, halo-$C_2$-$C_6$-alkenyloxy, nitro, amino, nitro-$C_1$-$C_6$-alkyl, nitro-$C_2$-$C_6$-alkenyl, nitro-$C_2$-$C_6$-alkynyl, five to six ring membered nitro-heterocyclyl, $C_1$-$C_6$-alkylamino, di-$C_1$-$C_6$-alkylamino, $C_2$-$C_6$-alkenylamine, $C_2$-$C_6$-alkynylamino, $C_1$-$C_6$-acyl, $C_2$-$C_6$-alkenoyl, $C_2$-$C_6$-alkynoyl, $C_1$-$C_6$-acylamino, di-$C_1$-$C_6$-acylamino, $C_1$-$C_6$-acyloxy, $C_1$-$C_6$-alkylsulfonyloxy, five to six ring membered heterocycloxy, five to six ring membered heterocycloamino, five to six ring membered haloheterocycloalkyl, $C_1$-$C_6$-alkylsulfenyl, $C_1$-$C_6$-alkylcarbonyloxy, $C_1$-$C_6$-alkylthio, $C_1$-$C_6$-acylthio, phosphorus-containing groups such as phosphono and phosphinyl, aryl having 6 to 10 carbon atoms, five to six ring membered heteroaryl, $C_1$-$C_4$-alkylaryl having 6 or 10 carbon atoms in the aryl, five to six ring membered $C_1$-$C_6$-alkylheteroaryl, cyano, cyanate, isocyanate, —C(O)NH($C_1$-$C_6$-alkyl), and —C(O)N($C_1$-$C_6$-alkyl)$_2$.

The present invention includes within its scope all isomeric forms of the compounds disclosed herein, including all diastereomeric isomers, racemates and enantiomers, unless the stereochemistry is fixed in the formula drawing. Thus, it is understood that the compounds disclosed herein include, for example, E, Z, cis, trans, (R), (S), (L), (D), (+), and/or (−) forms of the compounds, as appropriate in each case, unless the stereochemistry is fixed in the formula drawing.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of the method and use as mentioned above, will now be disclosed.

There is provided a method for soldering a first non-metallic component to one or more metallic or non-metallic component. The method may comprise a step of removably securing the first non-metallic component to the one or more metallic component by using a conductive polymeric composite. The method may further comprise a step of removably securing the first non-metallic component to the one or more non-metallic component by using the conductive polymeric composite. The conductive polymeric composite used in this method may comprise a blend of at least one filler material and at least one thermoplastic polymer.

The component referred to in the present disclosure may be an electrical component such as electrical wires, electrical pins or electrical connectors etc. The component may also be an electronic component such as a resistor, a capacitor, a transistor, a diode etc. The component may also refer to a substrate such as a circuit board, a non-metallic (e.g. plastic or glass) board comprising an electrical circuit or any substrates or elements that allow electricity to be conducted.

The method may be used for soldering a non-metallic electronic component to a metallic electronic component or another non-metallic electronic component. The soldering method may be used to repair broken connections in a circuit, to enhance contact between printed layers of exposed wires or to solder circuit components to printed circuits. The method may comprise the step of joining respective ends of the electronic components together using the conductive polymeric composite as defined above. This method can also be used for soldering components onto a substrate. Conversely, the present method may also be used to solder a metallic component to one or more non-metallic component.

Based on the above, a non-metallic component may be a conductive polymer. Meanwhile, the first non-metallic component referred to in this disclosure may be a plastic, glass, any flexible material that does not contain any metal or alloys. When a non-metallic flexible material is used, this component can be bent sufficiently without breaking.

The one or more metallic or non-metallic component which the first non-metallic component is soldered to or removably secured to may be present on a porous or non-porous substrate. This porous or non-porous substrate may be selected from the group consisting of plastic, glass, any flexible material and their combinations thereof. When a flexible material is used for the substrate, the substrate may be bent sufficiently without breaking.

The above method may be used to solder electronic components that are present on porous substrates, non-solderable substrates such as plastic, glass or on highly flexible substrates. Where the non-solderable substrate is glass, the thermoplastic polymer may comprise a polar polymeric matrix.

The present method is not a destructive method in the sense that the removal of the soldered material can be performed without destroying the components or substrates. Although a permanent soldered connection can be formed, this soldered connection can be removed or redirected with minimal damage to the components or substrates. This is because the soldering involves a conductive polymeric composite that is reflowable after curing upon application of heat. Based on this, the soldered material can be redirected or removed with or without the aid of additional device such as, but not limited to, a hot soldering tip or a soldering pen with hot end.

As mentioned above, because elevated temperatures are not needed, the one or more metallic or non-metallic component may be a thermally sensitive assembly or component capable of being soldered by the conductive polymeric composite. Hence, the present method may be applicable for soldering thermally sensitive assemblies or components. Temperature ranges wherein this method may be applicable include ranges between about 20 and 230° C., or between about 20 and 200° C., or between about 20 and 170° C., or between about 20 and 140° C., or between about 20 and 110° C., or between about 20 and 80° C., or between about 20 and 50° C., or between about 20 and 30° C., or between about 50 and 230° C., or between about 80 and 230° C., or between about 110 and 230° C., or between about 140 and 230° C., or between about 170 and 230° C., or between about 200 and 230° C., or between about 40 and 210° C., or between about 60 and 190° C., or between about 80 and 170° C., or between about 100 and 150° C., or between about 120 and 140° C., or temperatures about 20° C., or about 50° C., or about 80° C., or about 110° C., or about 140° C., or about 170° C., or about 200° C., or about 230° C.

The conductive polymeric composite used in the present method may comprise a blend of the filler material and the thermoplastic polymer. The filler material used in the present method may be blended as a continuous or dispersed phase with the thermoplastic polymer. The filler material may be dispersed within the thermoplastic polymer, the latter forming the continuous phase. Conversely, the filler material may be the continuous phase and the thermoplastic polymer may form a non-continuous phase. The internal structure of the conductive polymeric composite then depends on the filler and the thermoplastic polymer used, as well as their relative ratios.

The filler material may be a conductive filler material. Due to the conductive nature of the filler material, the filler material advantageously imparts conductive properties to the normally insulating thermoplastic polymer such that the resultant polymer composite exhibits conductivity.

The conductive filler may be non-metallic, metallic, metal-coated carbon based materials or their combinations thereof. More than one type of conductive filler may be used in the conductive polymer composite. Hence, the one type, two types or all three types of conductive filler may be present in the conductive polymer composite.

The non-metallic conductive filler may be selected from the group consisting of carbon black, carbon fiber, nanofiber, single- or multi-walled carbon nanotubes, graphene, graphite and combinations thereof. The metallic conductive filler may be selected from the group consisting of gold, platinum, nickel, cobalt, silver and combinations thereof. The metal-coated carbon based conductive filler may be metal-coated carbon black, metal-coated graphite, or metal-coated carbon nanotubes. The metal coating may be nickel, cobalt, iron and their combinations thereof.

The primary particle size of the filler is not particularly limited and may be in the nanosize-range. An acceptable range may be about between 1 to 300 nm, or between about 1 to 250 nm, or between about 1 to 200 nm, or between about 1 to 150 nm, or between about 1 to 100 nm, or between about 1 to 50 nm, or between about 10 to 300 nm, or between about 50 to 300 nm, or between about 100 to 300 nm, or between about 150 to 300 nm, or between about 200 to 300 nm, or between about 250 to 300 nm, or between about 10 to 200 nm, or the particle size may be at about 1 nm, at about 10 nm, at about 50 nm, at about 100 nm, at about 150 nm, at about 200 nm, at about 250 nm, or at about 300 nm. The size of the filler may depend on the soldering device used. For example, in 3D printing, the size of the conductive filler material may be less than 1% of the nozzle orifice to prevent clogging of the nozzle. Hence, the particle size then depends on the type of nozzle used in 3D printing.

The filler material may be present in the conductive polymer composite at a weight percentage (based on the weight of the composite) of about 20% to about 40%, about 20% to about 25%, about 20% to about 30%, about 20% to about 35%, about 25% to about 40%, about 30% to about 40%, about 35% to about 40%, or about 25% to about 35%.

The conductive polymeric composite may comprise at least one thermoplastic polymer. The composite may also comprise at least one thermoplastic matrix. The thermoplastic polymer or matrix may be derived from at least one monomer selected from the group consisting of acrylates, phthalamides, acrylonitriles, cellulosics, styrenes, alkyl, alkyl methacrylates, alkenes, alkenes, carboxylic acids, amides, imides, aryletherketones, butadienes, ketones, esters, acetals, hydroxyalkanoates, urethanes, dialkylsiloxanes, carbonates and their optionally substituted forms thereof. Exemplary monomers may be selected from the group consisting of methyls, ethylenes, propylenes, methyl methacrylates, methylpentenes, vinylidene, vinylidene chloride, etherimides, ethylenechlorinates, urethanes, ethylene vinyl alcohols, fluoroplastics, carbonates, styrenes, acrylonitrile-butadiene-styrenes, etheretherketones, ionomers, butylenes, phenylene oxides, sulphones, ethersulphones, phenylene sulphides, ethylene terephthalate, naphthalene terephthalate, ethylene naphthalene and combinations thereof.

The thermoplastic polymer may comprise polypropylene, acrylonitrile butadiene styrene, polylactic acid, polyethersulphone, polyoxymethylene, polycaprolactone, polyhydroxylbutyrate, polydimethylsiloxanes or maleimide acrylic preimidized polyimide.

An exemplary conductive polymer composite is polypropylene pellet with carbon black as non-metallic conductive filler. This particular composite may possess between 25% and 35% carbon black by weight of the composite. The resistivity may be in the range of $10^{-2}$ to $10^{-3}$ $\Omega m$ (or 1 to $10^{-1}$ $\Omega cm$).

To increase the wettability of the composite, small amounts of metallic fillers may be blended into the polymer matrix to increase wettability. If increased adhesion is required, a more polar matrix of a thermoplastic blend may be used. Examples of such polar thermoplastic blend may be made up of, but not limited to, polylactic acid and/or polycaprolactone. Accordingly, the present method relies on a conductive plastic solder (conductive polymeric composite) with improved wettability to form electrically conductive joint between non-metals and metals or non-metals. The conductive plastic solder itself may possess improved conductivity.

Advantageously, due to the presence of the thermoplastic polymer in the conductive polymeric composite, the thermoplastic polymer can re-flow after the solder has been set. The ability of reflowing solder is highly advantageous for changing components in circuitry and for repairing a circuit. In comparison, thermoset-based soldering composites cannot be used as thermosets cannot be reflowed without chemical degradation after curing. In addition, thermoset-based soldering composites often come as a two-part solution that needs to be premixed before used, or if it comes as a one part pre-polymeric composite, requires non-ambient condition (<0° C.) for storage. Hence, two-part-based thermoset solder is cumbersome to use while one-part-based thermoset solder is rather limited in their portability.

Advantageously, the conductive polymeric composite may be stored under ambient atmosphere and temperature due to the chemical stability of the conductive polymeric composite.

The resistivity of the conductive polymeric composite may be dependent or may be independent of the amount of conductive filler present in the composite. The resistivity of the conductive polymer composite may be less than about $10^{-2}$ $\Omega m$, less than about $10^{-3}$ $\Omega m$, less than about $10^{-4}$ $\Omega m$. Advantageously, the conductive polymeric composite may have high conductivities to sustain a voltage across the soldering points.

The soldering based on the conductive polymeric composite may be applied at 165° C. to 185° C. when a soldering tip is used or at 220° C. to 230° C. when an extrusion pen with hot ends is used. Hence, when securing or connecting the components together, these temperature ranges may be applicable. These temperature ranges may also be used when removing or redirecting any secured joints or connection.

There is also provided the use of a conductive polymer composite for soldering a first non-metallic component to one or more metallic or non-metallic component, wherein the conductive polymer composite comprises a blend of a filler material and a thermoplastic polymer as defined above. Accordingly, the conductive polymeric composite comprising a blend of a filler material and a thermoplastic polymer may be used as a soldering material.

The conductive polymeric composite may be used to form electrical connections between the electronic components. The conductive polymeric composite may be capable of repairing or enhancing electrical connections between one or more electronic component. The electrical connections may be removably formed between a metallic electronic component and a non-metallic electronic component or between two or more non-metallic electronic component. Hence, the electrical connections may be between the non-metallic electronic component and another non-metallic electronic component. The conductive polymeric composite may be used to assemble or repair flexible circuits used to bond flexible substrates and connectors.

The conductive polymeric composite may be used for forming joints between conductive polymers and conductive polymers or between conductive polymers and metals (particularly between conductive polymers and general electronic component leads) on substrates made of polymers or 3D-printable polymers.

The conductive polymeric composite may be in the form of a portable solid filament. The conductive polymeric composite and the present method provide improved wettability on metals leads of electronic components and on plastic substrates (e.g. ABS and PP) for securing electrical components onto plastic substrates by soldering.

The conductive polymer composite may adhere well to thermoplastic materials that are commonly used in Fused Deposition Modelling (FDM) method of 3D printing, so as to allow electrical components to be soldered onto such materials with ease. The conductive polymer composite may also adhere well to electrical components, providing good physical contact between the 3D printed electrically conductive thermoplastic circuit wires and the soldered components.

The conductive polymer composite may be compatible with standard electrical components (such as resistors, capacitors, LEDs, thermistors, transistors, etc) and can be used for soldering or desoldering with a standard soldering tip or hot-end.

It should be noted that any connection or joint formed by the present method using the conductive polymeric composite is a removably secured connection or joint. The connection or joint may provide a direct or indirect linkage. For instance, when an electronic component is soldered onto a plastic substrate via the present method, the conductive polymeric composite acting as the soldering joint may form in a way such that the electronic component is in direct contact with the joint and the plastic substrate. In another instance, when a connection is formed between two components on a substrate, the conductive polymeric composite may form in a way such that the two components are not in direct contact with each other but electricity can be conducted to or between these two components via the connection formed by the conductive polymeric composite.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1 shows a simple circuitry setup having connections made from conductive polymers or metals. The black material (including the IMRE logo) is conductive polymer composite or conductive thermoplastic composite; the silver color parts attached with electrical wires are dried silver ink.

FIG. 2 shows a closed functional 3D printed plastic circuit that connects a 9V battery to a blue light emitting diode (LED) with the LED on. The circuit is then cut with a penknife.

FIG. 3 shows a follow-up from FIG. 2. After cutting, the circuit is open and unable to light up the embedded blue LED (LED off).

FIG. 4 shows a follow-up from FIG. 3. After repair with plastic solder, the circuit recovers its function and lights up the embedded blue LED (LED on).

FIG. 5 shows a summary of an iterative method for compounding conductive thermoplastics composite with conductive filler. Further details on this procedure can be found in the detailed description of drawings.

FIG. 6 shows the volume resistivity of thermoplastic polypropylene (PP) composite containing various weight percentages of conductive carbon black (CB) filler.

FIG. 7 shows the Differential Scanning calorimetric (DSC) thermograms (exo-up) of conductive thermoplastic polypropylene (PP) composites of containing 15% CB (solid line), 25% CB (short dash), 32% CB (long dash) by weight during heating cycle (0→250° C.).

FIG. 8 Differential Scanning calorimetric (DSC) thermograms (exo-up) of conductive thermoplastic polypropylene (PP) composites containing 15% CB (solid line), 25% CB (short dash), 32% CB (long dash) by weight during cooling cycle (250→0° C.).

DETAILED DESCRIPTION OF DRAWINGS

FIG. 1 describes a conductive circuit 2, which is displayed on a non-conductive plastic substrate (ABS) 4. The conductive circuit 2 has ports 6 for connecting to a battery and ports 8 for connecting to an LED light bulb.

FIG. 5 describes the process of preparing the composite. In a first step, the thermoplastics are being mixed and compounded with conductive filler to extrude filament with lower weight percentage of filler, for example 25% by wt (14). Then, in a subsequent compounding step, the mixture is cut into cylindrical pellets (<1 cm long) and the pellets are mixed and compounded with more conductive filler to extrude filament with higher percentage of filler (16). After a first compounding step (16), the percentage of the filler is gradually increased (e.g. increment of 5-7%) until the desired percentage of the filler is obtained (20) and step (16) is repeated. Upon reaching the desired percentage of the filler, a homogenization step (18) is required. In this process step, the mixture is cut into cylindrical pellets (<1 cm long) and this is followed up by a further mixing and re-extruding step to homogenize the filler content of a filament further (18). This step may be optionally repeated to improve homogeneity of conductive-filler distribution within the filament (22).

EXAMPLES

Non-limiting examples of the invention and a comparative example will be further described in greater detail by reference to specific examples, which should not be construed as in any way limiting the scope of the invention.

Example 1

Example 1: Preparation of Thermoplastic Solders

Thermoplastic solders can be prepared by compounding of thermoplastic with non-metal fillers. One example is the compounding of carbon black (Enasco 260P, TIMCAL) with polypropylene (homo PP, SCG) using single- or twin-screw extruder. To ensure high uniformity and even distribution of filler present inside the resulting thermoplastic composite, there was performed an iterative compounding carbon black (CB) filler into polypropylene (PP) according to the steps described in FIG. 5. Typical weight percentages of carbon black in polypropylene are 5%, 10%, 15%, 20%, 25%, 30%, 35%, and 40 wt % (FIG. 6). FIG. 6 shows the volume resistivity of thermoplastic polypropylene (PP) composite containing various weight percentages of conductive carbon black (CB) filler. It can be seen from FIG. 6, that the volume resistivity is very high (>1000 m·Ohm) when a small amount of carbon black is embedded in the polypropylene and drops below 0.01 m·Ohm at percentages higher 30%.

Characterization of the THERMOPLASTIC COMPOSITES

Electrical resistivity of conductive composite filaments containing 5% to 40% of carbon black by weight is summarized in FIG. 6. When the amount of carbon black in the composite exceeds 30% by weight, the electrical resistance of the composite drops below $10^{-2}$ Ωm. Differential scanning calorimetry (DSC) analyses of the composites are summarized in FIGS. 7 and 8.

FIG. 7 shows the Differential Scanning calorimetric (DSC) thermograms (exo-up) of conductive thermoplastic polypropylene (PP) composites of containing 15% CB (long dash), 25% CB (solid line), 32% CB (short and long dash) by weight during heating cycle (0→250° C.). It can be seen that the transition temperature various mixtures of carbon black in polypropylene is at about between 160-180° C.

FIG. 8 Differential Scanning calorimetric (DSC) thermograms (exo-up) of conductive thermoplastic polypropylene (PP) composites containing 15% CB (long dash), 25% CB (solid line), 32% CB (short and long dash) by weight during cooling cycle (250→0° C.). It can be seen that the transition temperature various mixtures of carbon black in polypropylene is at about between 110-125° C.

Example 2

Soldering Process

FIG. 1 is a diagram of a simple circuitry setup having connections made from conductive polymers or metals. For further clarification, it is a closed functional 3D printed plastic circuit that connects a 9V battery to a blue light emitting diode (LED). In the initial setting in FIG. 2, the LED light is on (10). The circuit is then cut with a penknife (FIG. 2). After cutting into the circuit, the circuit is open (resulting in cut 12, FIG. 3) and the embedded blue LED does not light up (10', FIG. 3).

A soldering step is then performed to repair the circuit. The plastic solder used in this example is a thermoplastic composite >25 weight % carbon black in polypropylene and its preparation is described in Example 1. Two soldering methods have been tested on the plastic solder for repairing the circuit. In one method, the plastic solder is brought into contact with the hot end of a soldering iron pre-heated to 200-230° C. The region of the plastic solder in direct physical contact with the hot end of a soldering iron is softened and partially melted into viscous liquid. The liquefied form of plastic solder is then deposited at the site of the circuit that has been damaged with penknife. Once the gap of the damaged circuit is filled with liquefied plastic solder and the soldering iron is removed from the plastic solder deposited at the previously damaged site, the liquefied plastic solder solidified rapidly (in less than 10 seconds).

In another method, a filament of plastic solder of appropriate diameter is inserted into the top of a 3D-printing pen, which has an open nozzle at bottom heated to 230° C. The inserted filament is then guided and driven mechanically to the interior of the printing pen when the user switches on the gear system of the printing pen. When the inserted plastic solder comes into contact with the heated nozzle, the region of the plastic solder in immediate physical contact with the heated nozzle is softened and partially melted into viscous liquid. The liquefied form of plastic solder is then deposited at the site of the circuit that has been previously damaged with penknife. Once the gap of the damaged circuit is filled with liquefied plastic solder and the 3D printing pen is removed from the plastic solder deposited at the damage site, the liquefied plastic solder solidified rapidly (in less than 10 seconds) and bridges the open ends.

After a soldering step according to any one of the two methods described immediately above, the circuit is repaired with plastic solder (12', FIG. 4) and recovers its function. The embedded LED light bulb lights up (10''', FIG. 4).

INDUSTRIAL APPLICABILITY

The developed method and conductive polymeric composite may be used for soldering electrical components to electrical circuits or for repairing damaged circuits. These circuits may be derived from thermoplastics.

The method may be further used for soldering a non-metallic electronic component to a metallic electronic component or another non-metallic electronic component. The soldering method may be used to repair broken connections in a circuit, to enhance contact between printed layers of exposed wires or to solder circuit components to printed circuits. The method may comprise the step of joining respective ends of the electronic components together using the conductive polymeric composite as defined above. This method can also be used for soldering components onto a substrate. Conversely, the present method may also be used to solder a metallic component to one or more non-metallic component.

The developed method and conductive polymeric composite may serve to provide a conductive solder for making joints between metallic leads of electrical components and conductive polymer or for making joints between conductive polymers and conductive polymers. Particularly, the conductive polymeric composite can be used as conductive solder for repairing 3D-printed electrically conductive circuit.

The presently developed method and conductive polymeric composite can also be used for soldering electronic components to 3D printed parts, repairing 3D printed polymer circuits. They can be used in the toy industry for low cost integrated wiring in toys so as to provide electrical functionalities such as, but not limited to, forming joints or for self-repairs.

Advantageously, the developed method and conductive polymeric composite addresses the above limitations and disadvantages while providing improved wettability.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:

1. A method for soldering a first non-metallic component to one or more metallic or non-metallic components, the method comprising:
    removably securing the first non-metallic component to the one or more metallic component by using a conductive polymeric composite; or
    removably securing the first non-metallic component to the one or more non-metallic component by using the conductive polymeric composite,
    wherein the conductive polymeric composite used in the method comprises a blend of carbon black and polypropylene.

2. The method of claim 1, wherein the one or more metallic or non-metallic component is present on a porous or non-porous substrate.

3. The method of claim 2, wherein the porous or non-porous substrate is selected from the group consisting of plastic, glass and their combinations thereof.

4. The method of claim 1, wherein the one or more metallic or non-metallic component is a thermally sensitive assembly or component capable of being soldered by the conductive polymeric composite.

5. The method of claim 1, wherein the carbon black is about 20% to 40% weight percent based on the weight of the conductive polymeric composite.

6. The method of claim 5, wherein the carbon black is about 25% to 35% weight percent based on the weight of the conductive polymeric composite.

7. The method of claim 1, wherein the removably securing step occurs at a temperature of 165° C. to 185° C. when a soldering tip is used or a temperature of 220° C. to 230° C. when an extrusion pen with hot ends is used.

8. A method of using a conductive polymer composite for soldering a first non-metallic component to one or more metallic or non-metallic component, wherein the conductive polymer composite comprises a blend of carbon black and polypropylene.

9. The method of claim 8, wherein the conductive polymeric composite is capable of forming, repairing or enhancing electrical connections between one or more electronic component, wherein the electrical connections are removably formed between a metallic electronic component and a non-metallic electronic component or between two or more non-metallic electronic component.

* * * * *